(12) United States Patent
Hawkins et al.

(10) Patent No.: US 8,578,653 B2
(45) Date of Patent: Nov. 12, 2013

(54) DRIVE ASSEMBLIES

(75) Inventors: Ray Hawkins, Victoria (AU); Toan Dang, Victoria (AU)

(73) Assignee: Automatic Technology (Australia) Pty Ltd, Keysborough Victoria (AU)

( * ) Notice: Subject to any disclaimer, the term of this patent is extended or adjusted under 35 U.S.C. 154(b) by 382 days.

(21) Appl. No.: 12/734,571

(22) PCT Filed: Oct. 20, 2008

(86) PCT No.: PCT/AU2008/001547
§ 371 (c)(1),
(2), (4) Date: Sep. 9, 2010

(87) PCT Pub. No.: WO2009/049379
PCT Pub. Date: Apr. 23, 2009

(65) Prior Publication Data
US 2010/0325965 A1 Dec. 30, 2010

(30) Foreign Application Priority Data

Oct. 19, 2007 (AU) ................................ 2007905747
Feb. 19, 2008 (AU) ................................ 2008900780

(51) Int. Cl.
*E05F 11/00* (2006.01)
(52) U.S. Cl.
USPC .............................................. 49/199; 49/197
(58) Field of Classification Search
USPC ............ 49/197, 199, 139, 140; 160/188, 201;
474/255, 256, 257, 253; 24/31 R, 32,
24/31 B, 37, 31 C; 403/286, 292, 293, 300,
403/302, 309, 107, 108, 206, 209
See application file for complete search history.

(56) References Cited

U.S. PATENT DOCUMENTS

| 3,537,503 | A | * | 11/1970 | Simmonds | 160/188 |
| 3,683,710 | A | * | 8/1972 | MacFarland | 74/89.21 |
| 3,722,141 | A | | 3/1973 | Miller | |
| 4,018,005 | A | * | 4/1977 | Harris | 49/199 |
| 4,241,540 | A | * | 12/1980 | Depperman | 49/199 |
| 4,352,585 | A | * | 10/1982 | Spalding | 403/24 |
| 4,520,684 | A | | 6/1985 | Meyer et al. | |

(Continued)

FOREIGN PATENT DOCUMENTS

| DE | 3341166 A1 * | 5/1985 |
| DE | 3442 224 A1 | 5/1986 |

(Continued)

*Primary Examiner* — Jerry Redman
(74) *Attorney, Agent, or Firm* — Nixon & Vanderhye

(57) ABSTRACT

Drive assembly for a door, gate or barrier, having a rail or track, a trolley for connection to the door, gate or barrier, mountable to run along the rail or track, and a longitudinal drive having a chain or belt connectable in a closed loop arrangement around or within the rail or track. The trolley is provided with an engagement mechanism for selective engagement between the trolley and the longitudinal drive mechanism, whereby the engagement mechanism includes an engagement member arranged for selective movement in a direction substantially transverse to the longitudinal direction of the longitudinal drive and in a direction less than 45° from the plane of the loop of the longitudinal drive. The engagement member includes or cooperates with a cam part arranged for selective rotation about the engagement member, and a camming cooperation occurs between the cam part and the trolley body for converting rotation of the cam part about the engagement member into the required movement of the engagement member.

17 Claims, 8 Drawing Sheets

(56) References Cited

U.S. PATENT DOCUMENTS

| | | | |
|---|---|---|---|
| 4,628,636 A * | 12/1986 | Folger | 49/199 |
| 5,010,688 A | 4/1991 | Dombrowski et al. | |
| 5,085,094 A * | 2/1992 | Clawson et al. | 74/424.6 |
| 5,222,403 A * | 6/1993 | Angelini et al. | 74/89.21 |
| 5,846,151 A | 12/1998 | Hormann | |
| 5,918,418 A | 7/1999 | Richmond et al. | |
| 6,309,318 B1 | 10/2001 | Hormann | |
| 7,076,917 B2 * | 7/2006 | Chang | 49/139 |
| 7,810,219 B2 * | 10/2010 | Lindemann | 24/31 R |
| 8,001,725 B2 * | 8/2011 | Lhotak | 49/199 |

2006/0228170 A1 * 10/2006 Joo ............... 403/286

FOREIGN PATENT DOCUMENTS

| | | |
|---|---|---|
| EP | 0 735 296 B1 | 6/1998 |
| GB | 2106589 A * | 4/1983 |
| GB | 2 274 308 A | 7/1994 |
| JP | 04069433 A * | 3/1992 |
| JP | 9 303061 A | 11/1997 |
| WO | WO 98/13625 A1 | 4/1998 |
| WO | WO 02/099235 A1 | 12/2002 |

* cited by examiner

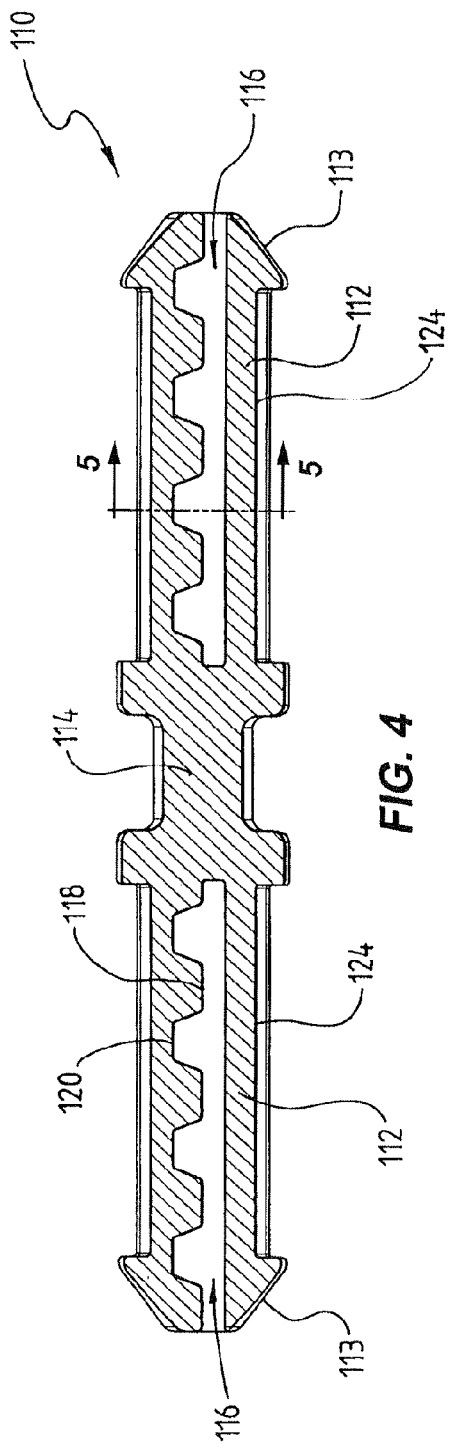
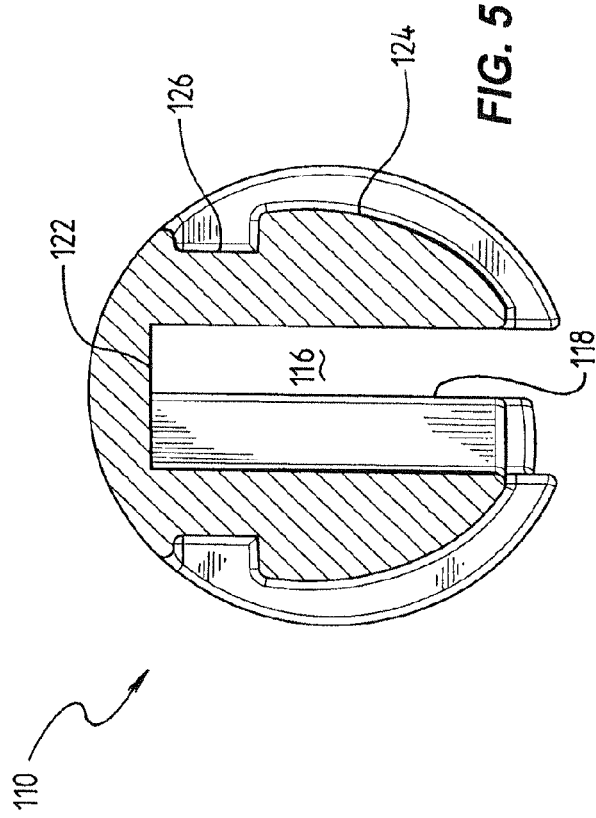
FIG. 4
FIG. 5

DRIVE ASSEMBLIES

This application is the U.S. national phase of International Application No. PCT/AU2008/001547 filed 20 Oct. 2008 which designated the U.S. and claims priority to Australian Application No. 2007905747 filed 19 Oct. 2007, and Australian Application No. 20089007890 filed 19 Feb. 2008, the entire contents of each of which are hereby incorporated by reference.

FIELD OF THE INVENTION

The present invention relates to drive assemblies, and particularly to drive belt and drive chain assemblies.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

Continuous toothed belts capable of power transmission are often referred to as timing belts or cam belts, acknowledging their common application as a part of an internal combustion engine to control the timing of the engine's valves. Such belts are usually flat and incorporate integral teeth, although other profiles, such as V-belts, are also known, and for certain applications the teeth may be separately formed and connected to a planar flexible belt web.

The teeth of the belt fit into matched toothed pulleys, or sprockets. When correctly tensioned, there is no slippage between belt and pulley/sprocket, affording accurate synchronisation between the rotations of drive and driven pulleys/sprockets.

Non-automotive applications include use in any mechanism where it is necessary to interchange rotary motion and linear motion, where either high loads are encountered or maintaining a specific drive ratio (eg. for indexing purposes) is important, and where chain drives might alternatively be used. A common non-automotive application is in linear positioning systems. While chains and gears may be more durable, flexible belts are generally quieter in their operation, are considerably lighter (and hence mechanically more efficient), and can be less expensive.

Typically, a timing belt is made of rubber incorporating high-tensile fibers, such as steel, fibreglass or aramid (eg. Twaron™/Kevlar™) running the length of the belt. For high temperature applications, belts may be made of temperature-resistant materials such as highly-saturated nitrile (HSN) materials.

Conventionally, belts have trapezoid-shaped teeth, but newer manufacturing techniques allow for production of curved teeth that can have the advantage of being quieter in operation and lasting longer.

For some applications, such as use as an automotive engine timing belt, the belt must be continuous and unbroken, and the ends of the belt length are generally welded together by the manufacturer. For applications of linear positioning, such as driving automatic barriers, gates or doors, it is common to supply lengths of belt stock for cutting to length and installation as required. In such applications, a connector means is required to hold the ends of the belt in a fixed relative position. Commonly, the ends of the belt may be attached to the connector means by fasteners (eg. by screws) or by crimping or clamping of shaped jaws. However, such devices can damage or weaken the belt, and make later adjustment or refitting of the same belt (eg. during maintenance) difficult or impossible.

Both chains and flexible drive belts are commonly used in drive assemblies for doors, gates or barriers, such as garage door drives. In such drive assemblies for overhead doors or sectional doors, the chain or belt is generally arranged in a closed loop between an idler sprocket and a drive sprocket, and a trolley or carriage connected thereto is mounted to slide along or within an overhead longitudinal rail, the trolley or carriage attached by means of a suitable linkage to the door. An electronically-controlled motor unit selectively drives the chain or belt, so moving the door between open and closed positions.

SUMMARY OF THE INVENTION

In a first aspect, the invention provides a connector for a flexible toothed belt or similar, including a body having an internal recess with a shaping complementary to that of the toothed belt, configured to allow an end portion of the belt to be engaged therein in a direction transverse to the belt longitudinal direction, so to retain the belt against disengagement in the longitudinal direction.

Preferably, the connector is for use with a flat belt, and the recess is a slot formed in the connector body, the slot defined by first and second internal surfaces, at least one of which features spaced transverse grooves shaped and sized to accommodate a plurality of belt teeth.

The slot is thus configured to allow the flat belt to be slideably engaged therein in the transverse direction.

Preferably, the portion of the connector body in which the recess is formed is rigid. This prevents the flexing of the connector around the belt, which might otherwise give rise to risk of inadvertent disengagement.

In a preferred form, the recess is closed at one side lateral to the longitudinal direction, to provide an abutment against which the belt can be positioned when engaged therein.

The connector body preferably has a generally cylindrical shape, in the form of a connector shuttle.

In a preferred form, a portion of the connector body in which the recess is formed is provided with a tapering surface. This assists in engagement of the connector body with a driven member (a component to be driven by movement of the belt).

Preferably, the portion of the connector body in which the recess is formed has a width approximately equal to that of the belt, so as not to project substantially beyond the lateral edges of the belt. This minimises risk of interference with any other part of the assembly.

The connector may feature two belt-engagement portions, one at each end of the body, each having an internal recess in which to engage respective ends of a single length of flexible belt stock.

The body may include a drive engaging element, to afford connection between the belt and driven member, so to enable the required drive of the driven member. The drive engaging element may comprise a narrowed portion or indentation between the two belt connection portions.

The connector may include, or be provided in combination with, a cover element for securing in place to close the internal recess once the end of the belt has been engaged therein. Preferably, the cover element and the connector body are shaped to afford a snap-fit connection therebetween. In one form, the cover element is a part-cylindrical sleeve configured to engage over the body of the connector in a transverse direction.

The device has the advantage that it does not need to be clamped onto the belt, nor pierced by fasteners, thus avoiding any potential weakening or damage to the belt.

Disengaging the belt, for maintenance or replacement, is very simple. It will be noted that the form of the portions of the connector body in which the recess is formed provides a device of such rigidity that no additional fastening means is required, particularly so if the recess is closed at one lateral side. The cover element is merely to protect the belt engagement against ingress of dirt, to prevent the unlikely transverse movement of the belt relative to the connector during operation, and to provide a substantially unbroken outer surface of the portion of the connector body in which the recess if formed.

In a further aspect, the invention provides a belt drive assembly for a door, gate or barrier, including a toothed belt connected in a closed loop around a rail or track by means of the above-defined connector.

In a further aspect, the invention provides a drive assembly for a door, gate or barrier, including:
 a rail or track;
 a trolley for connection to the door, gate or barrier, the trolley mountable to run along the rail or track; and
 a toothed belt connectable in a closed loop arrangement around or within the rail or track by means of the above-defined connector,
 wherein the trolley includes an engagement means for selective engagement between the trolley and the connector.

In a preferred form, the trolley includes a longitudinal bore configured to accommodate the connector, and the engagement means provides engagement between the trolley and the connector when the connector is positioned within the longitudinal bore.

The bore may be a closed bore within the trolley body, or may be an open bore whose shape affords the guidance of the connector.

Preferably, the engagement means between the trolley and the connector includes a recess and an engagement member arranged for selective movement in a direction substantially transverse to the belt longitudinal direction and in a direction less than 45° from the plane of the loop of the belt.

In a further aspect, the invention provides a drive assembly for a door, gate or barrier, including:
 a rail or track;
 a trolley for connection to the door, gate or barrier, the trolley mountable to run along the rail or track;
 a longitudinal drive means comprising a chain or belt, connectable in a closed loop arrangement around or within the rail or track;
 the trolley provided with an engagement means for selective engagement between the trolley and the longitudinal drive means;
 whereby the engagement means includes an engagement member arranged for selective movement in a direction substantially transverse to the longitudinal direction of the longitudinal drive means and in a direction less than 45° from the plane of the loop of the longitudinal drive means.

This provides that the actuator for the engagement member can be mounted substantially centrally of the trolley, which affords particular advantage when used with certain types of rail or track, particularly partially enclosed tracks in which the trolley is mounted to run within the track.

Preferably, said engagement member is arranged against a resilient bias for cooperation with a detent means provided in or attached to the longitudinal drive means.

In a preferred form, said engagement member includes or cooperates with a cam part arranged for selective rotation, a camming cooperation between said cam part and the trolley body converting rotation of the cam part into the required movement of the engagement member.

A radial arm may extend from said cam part, such that pulling on the radial arm rotates the cam part, so resulting in the required movement of the engagement member.

The drive assembly may include a pull member such as a cord or element attached to the radial arm to effect the selective engagement between the trolley and the longitudinal drive means.

The engagement member may take the form of a cylindrical pin or shaft, the required movement being in its axial direction.

Preferably, the camming cooperation between said cam part and the trolley body provides a two-position bias, the positions separated by approximately 90° of rotation of the cam part.

The trolley may be provided with wheels adapted to run along the rail or track.

In yet a further aspect, the invention provides a drive assembly for a door, gate or barrier, including:
 a partially enclosed track;
 a trolley for connection to the door, gate or barrier, the trolley mountable to run within the partially enclosed track;
 a flexible longitudinal drive means, such as a chain or belt, connectable in a closed loop arrangement within the partially enclosed track and engageable with the trolley;
 wherein the trolley is provided with wheels adapted to run within and supported by the partially enclosed track.

Preferably, the track has a substantially C-section form, the opening of the C-section to be oriented in a downward direction, the C-section form including inwardly-directed flange portions to provide runways for the trolley wheels.

This aspect of the invention serves to assist the smooth translation of the trolley along the track, particularly advantageous if the track is assembled from modular sections, to allow for discontinuities or unevenness at transitions between successive sections.

BRIEF DESCRIPTION OF THE DRAWINGS

The invention will now be further explained and illustrated by reference to the accompanying drawings in which:

FIG. 4 is a longitudinal cross section of the body portion of the device of FIG. 2;

FIG. 5 is a transverse cross sectional view through plane A-A of FIG. 4;

DETAILED DESCRIPTION OF THE DRAWINGS

Whilst the following description concerns use of the invention with a garage door operating system, it is to be understood that the invention may be applied in a very wide variety of applications where reciprocal motion is required. In particular, the invention may be used in driving any form of moveable closure or barrier such as a door, shutter, barrier or gate.

It will also be understood that, with regard to the discussion of forms of the invention employing drive belts, a toothed belt embraces any type of belt for synchronous drive, generally having regularly spaced projections from the belt web, including corrugated belts, notch belts, Gilmer belts, helical offset belts, etc.

Figure 1:
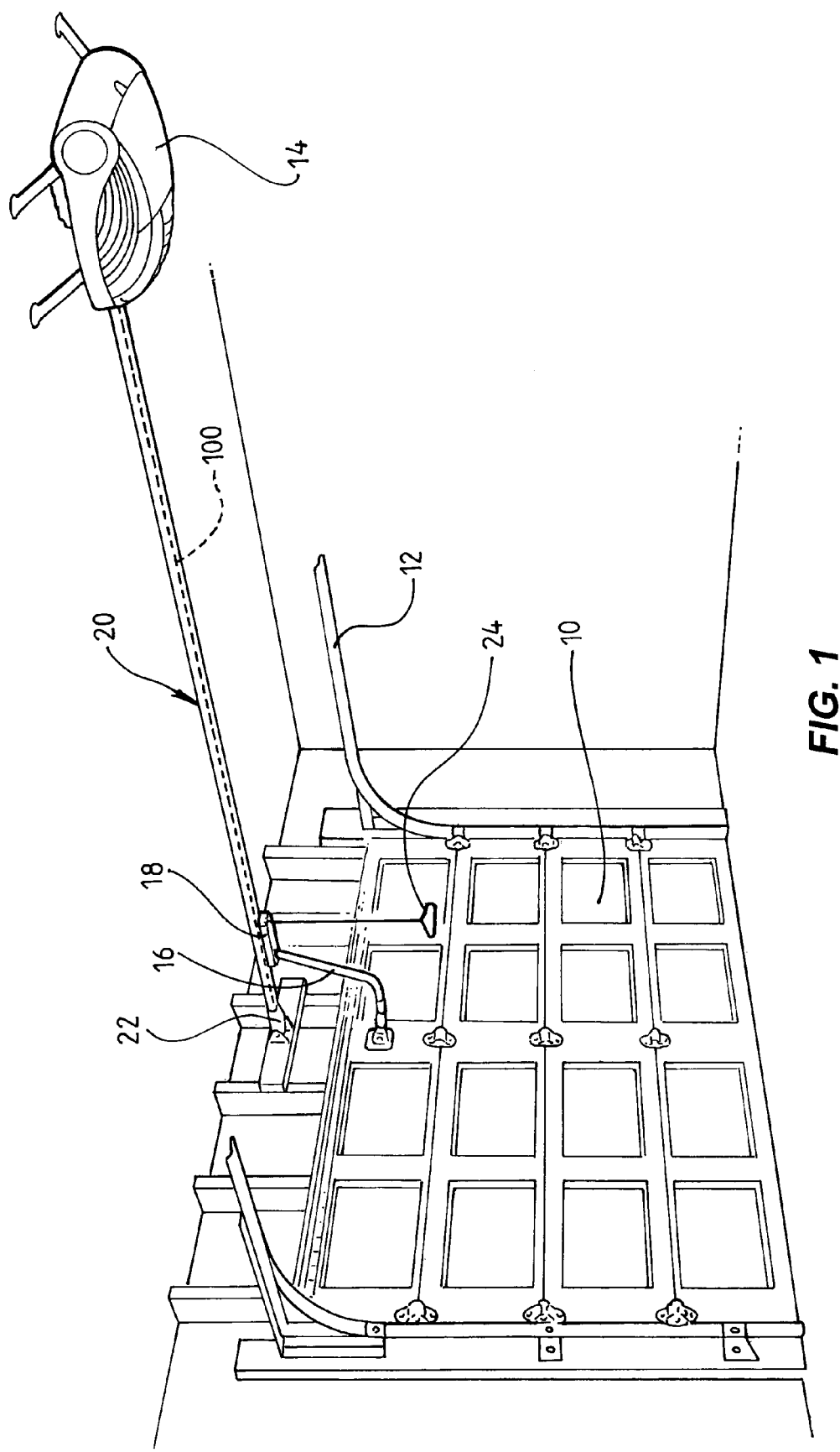
FIG. 1 is a perspective view of an installed garage door operator system.

Referring now to FIG. 1, a sectional garage door 10 comprises an articulated series of linked panels (in this example, four) arranged to be guided by edge rollers running in lateral guiding and support tracks 12, between a closed vertical position (as shown) and an open, overhead horizontal position.

Remote-controlled operator device 14 comprises an electronically controlled electric motor drive to move door 10 between its tow positions by way of door arm 16, hingedly connected to door 10. By way of a drive sprocket (not shown), operator 14 drives door arm 16 by means of a belt 100 which moves a drive trolley 18 along an overhead longitudinal rail 20. Rail 20 is mounted by way of a header 22 to the wall above the garage door opening, and an idler belt sprocket arranged within rail 20 at header end 22 allows the trolley to be moved in both directions to open and close door 10. An emergency release handle 24 is provided attached by way of a cord to a mechanism in trolley 18 to allow selective disengagement of the trolley from the belt drive (see below), in order to manually operate the door in the event of power failure, etc. In an alternative form, the emergency release handle can be provided on operator 14 to disengage the motor drive from the drive sprocket.

Trolley 18, described in further detail below, is engaged with the drive belt 100 by means of a connector shuttle 110 (FIG. 2), which also serves the purpose of securely engaging the respective ends 106 of belt 100.

Figure 2:
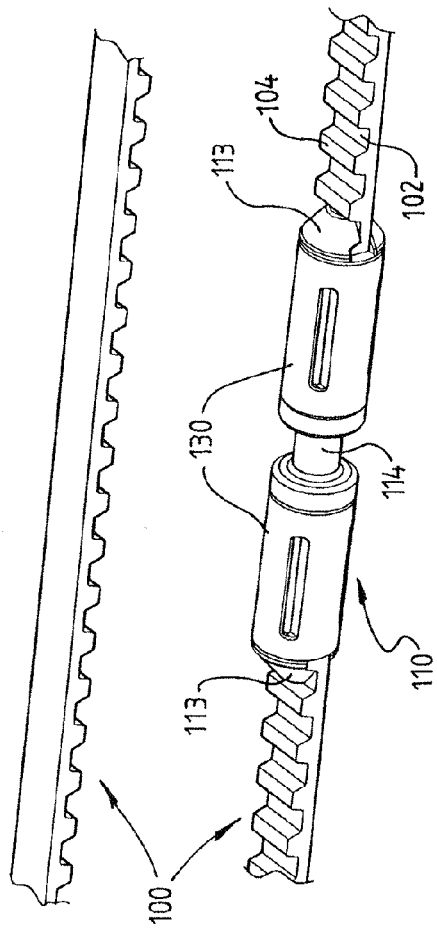
FIG. 2 is a perspective view of a belt connector device according to the present invention.
Figure 3:
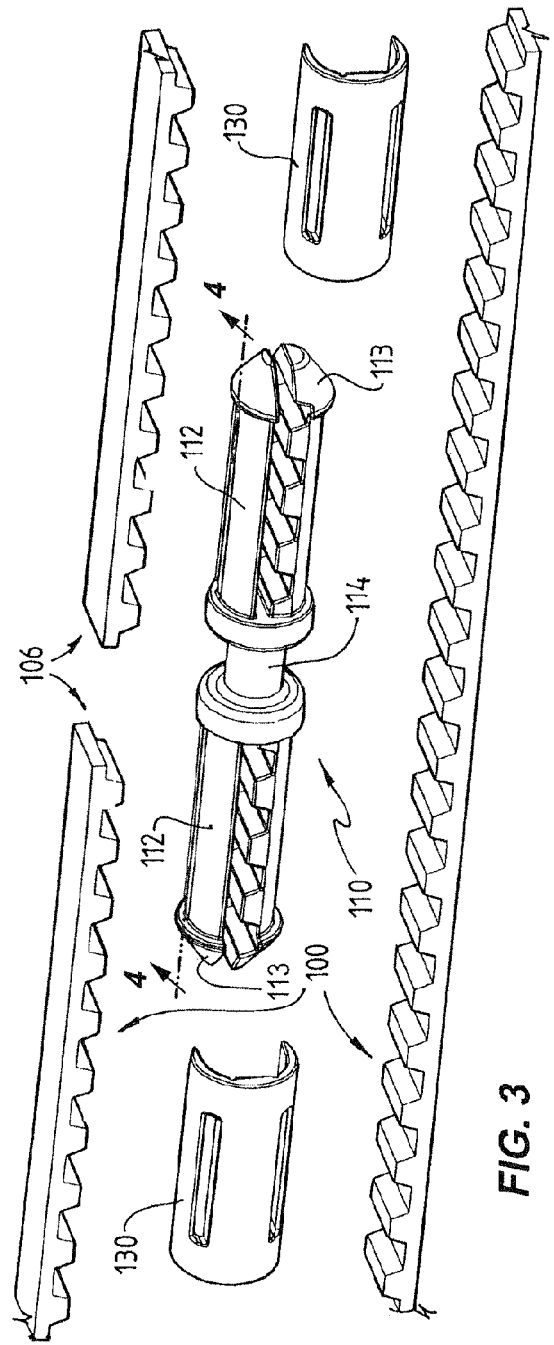
FIG. 3 shows an exploded view of the device of FIG. 2.

As FIGS. 2-4 show, the body of connector shuttle 110 is formed of two like cylindrical end portions 112 connected by a narrowed cylindrical bridging part 114. In use, the axis of connector shuttle is positioned in the longitudinal direction of the belt 100 as shown.

Each cylindrical portion 112 features a tapering end portion 113 (in this case a conical shaping, although alternative forms—such as champfered or rounded end portions—can be adopted) and includes a slot 116 formed along its length and open at end portion 113 and along one side, as shown. Each slot 116 has a complementary shaping to the longitudinal profile of toothed belt 100. One internal face of the slot is planar, whilst the other internal face features transverse grooves 120, evenly spaced in the longitudinal direction (FIG. 4). Grooves 120 accommodate belt teeth 104, whilst intervening crests 118 correspond to the web portions 102 of belt 100 (FIG. 4).

Each slot 116 is closed by a longitudinal lateral wall 122 on one side (FIG. 5) which connects the internal faces of the slot, to provide a lateral abutment surface for belt 100.

Figure 6:
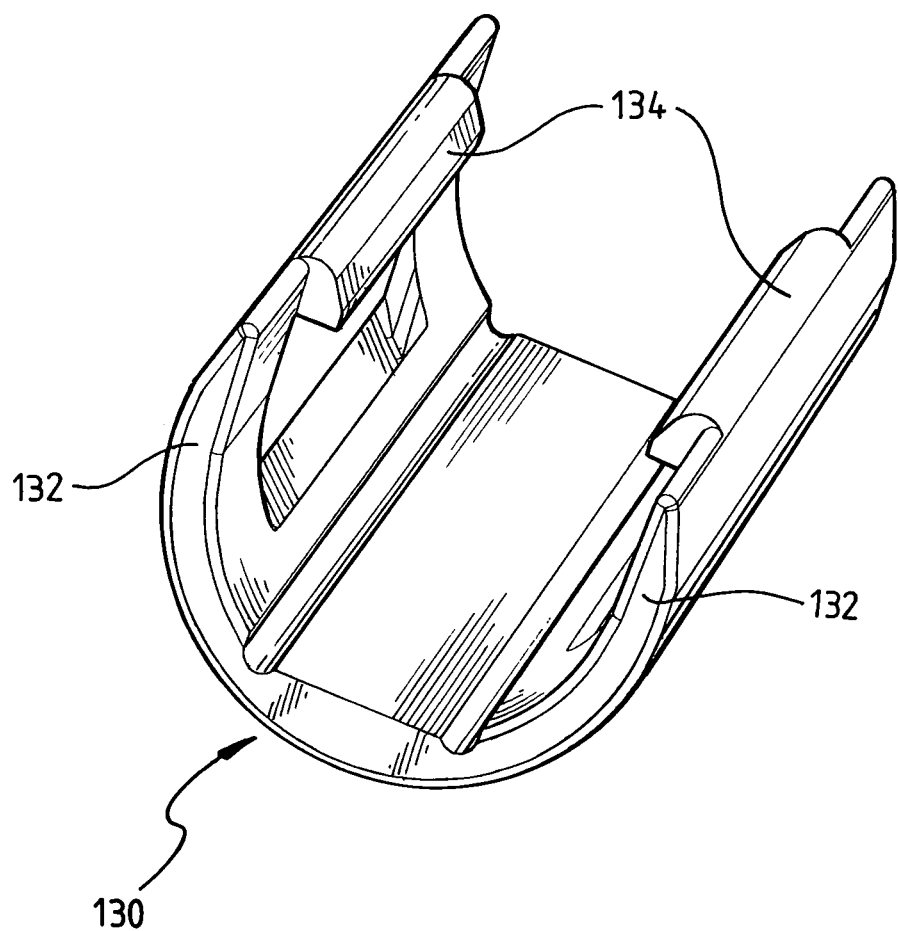
FIG. 6 is a perspective view of a cover element of the device of FIG. 2.

Each cylindrical portion 112 of shuttle 110 features a reduced extended radius for a part of its circumference, providing an external surface part 124 to accommodate a removable snap-fit part-tubular cover element 130 (FIG. 6). External surface part 124 terminates in a longitudinal groove 126 along a part of its length, to accommodate inwardly-directed locating tabs 134 of cover element 130. The walls 132 of the cover element 130 are configured to be accommodated against the connector shuttle external surface part 124, such that when the cover elements are in place, each cylindrical portion 112 presents a substantially unbroken cylindrical surface, to assist in engagement with trolley 18, as described further below.

The body of connector shuttle 110 is formed of a suitable material, such as zinc alloy, white cover element 130 is formed from a suitable plastics material, such as polypropylene.

Drive trolley 18 comprises a trolley body 140, manufactured from suitable plastics material and sized and shaped to engage in and run smoothly in both directions along track 20. A lower connection portion 142 is configured for attachment of the end of door arm 16. Trolley body 140 features two longitudinal cylindrical bores 144 and 144' sized to accommodate connector shuttle 110 with minimum play. A transverse pin or shaft 146 is mounted in a bore within trolley body 140 as shown, biased to move into longitudinal bore 144 by a compression spring 152. A clutch lever 150 is mounted for rotation about shaft 146, in a camming interengagement with a shaped part of trolley body 140. The cam action of rotation of clutch lever 150 relative to trolley body 140 results in transverse movement of lever 150 in a direction away from longitudinal bore 144 and hence, by virtue of a split ring 148 engaged around shaft 146, resulting also in movement of shaft 146 in the same direction, so to compress spring 152.

Use of the device is as follows. A single length of belt 100 is engaged around the idler sprocket at the track header 22 and around the drive sprocket of operator device 14, so that it travels around the track in two straight runs. The belt is run through the respective longitudinal bores 144 and 144' in trolley 18, the trolley mounted to run in track 20.

One end 106 of the belt is slid transversely into a first slot 116 of connector shuttle 110 so that a number (in this case, four) of the teeth 104 are engaged within grooves 120. A cover element 130 is then slipped over the slot from the transverse direction and snap-fits into place by locating tabs 134 engaging in grooves 126. The belt is cut to length if required, and other end 106 of the belt is then engaged with the second slot which is then closed with a second cover element 130.

Adjustment of the belt tension can be performed by way of position adjustment of the idler wheel in header 22. The track and operator assembly is attached to the garage ceiling and door arm 16 is connected to trolley 18.

Connector shuttle 110 is engaged with trolley 18 by moving the two parts relative to one another to bring the body of the connector shuttle into longitudinal bore 144 until transverse shaft 146 clicks into engagement—under action of spring 152—with the detent provided by narrowed bridging part 114 of the connector shuttle. The conical end portions 113 ensure that the connector shuttle is readily centred into longitudinal bore 144, and provides a tapered surface to urge shaft 146 against the spring bias as connector 110 engages with trolley 18. The trolley is thus firmly engaged with the connector shuttle for normal operation, allowing substantially no rotational or translational movement therebetween, whilst the second run of the belt runs freely through bore 144'.

It will be appreciated by the skilled reader that second longitudinal bore 144' is not required for engagement with the connector shuttle, and any form of trolley that affords free travel of the belt is therefore possible. It will also be appreciated that longitudinal bore 144 does not have to be a closed bore, so long is it fulfils the required function of guiding and accommodating the connector in its engagement position with the trolley.

Trolley 18 can be selectively disconnected from connector shuttle 110 (eg. for manual operation of the garage door, such as in the case of a power failure) by pulling down on release handle 24 of a cord attached to the end of clutch lever 150, resulting in the withdrawal of shaft 146 from part 114 against the spring bias, thus allowing the trolley to run freely in track 20. Re-engagement is simply a matter of releasing shaft 146 by movement of clutch lever 150 in the opposite direction, and moving the garage door (or, alternatively, driving belt 100 and connector shuttle 110 by way of operator 14) until the connector shuttle engages once again in longitudinal bore 144 and shaft 146 resiliently engages in part 114.

As the skilled reader will appreciate, removal of the belt by a technician for maintenance or replacement is very simple, as the technician simply needs to access the connector shuttle 110, remove cover elements 130, and slide out the belt ends 106. Moreover, if the belt stretches and the maximum possible adjustment of the assembly has been reached (ie. the maximum possible position adjustment of the header idler wheel has been reached), then the technician simply needs to slacken off the belt by way of the adjustment means, cut off one or a small number of teeth from an end 106 of the belt, and reengage the belt with the connector shuttle (and adjust the belt tensioning means as necessary).

Figure 9:
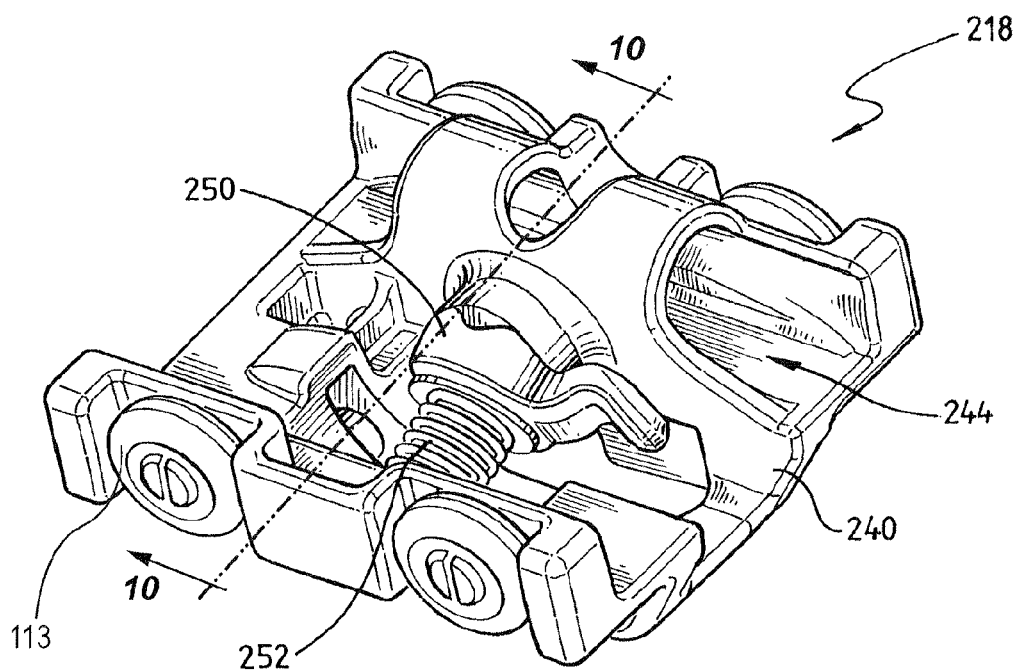
FIG. 9 is a is a perspective view of an alternative form of drive trolley for use with a garage door operator system.
Figure 10:
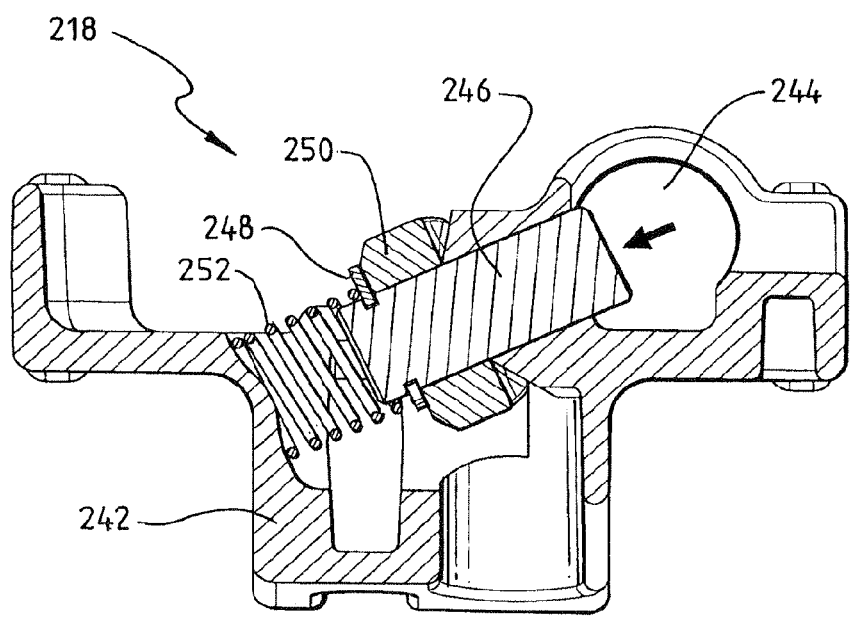
FIG. 10 is a cross sectional view of the drive trolley of FIG. 9.
Figure 11:
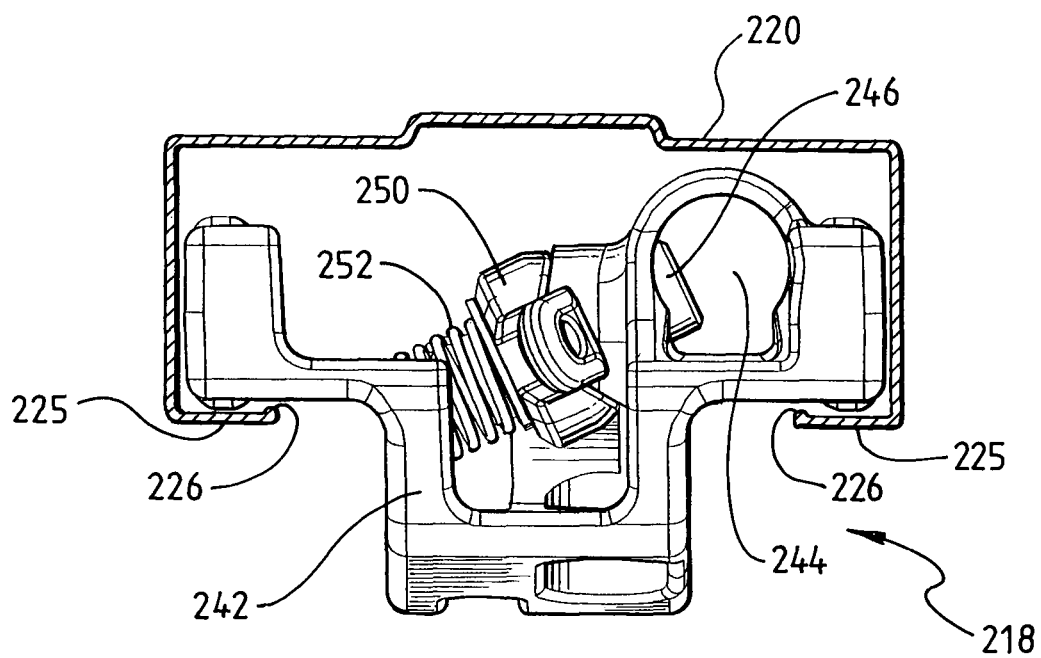
FIGS. 11-14 are, respectively, an end elevation view, a side elevation view, an upper plan view and a lower plan view of the drive trolley or FIG. 9.
Figure 12:
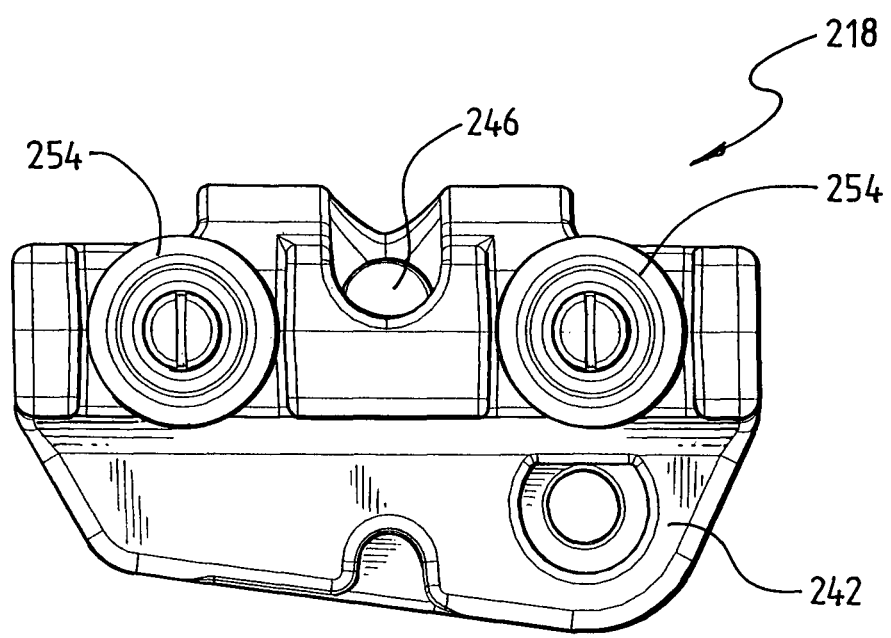

An alternative form of drive trolley 218 is illustrated in FIGS. 9-14, with corresponding component parts bearing the same reference numbers, but commencing with the digit "2". Once again, lower connection portion 242 provides means for attaching door arm 16. Trolley body 240 features only one cylindrical bore 244 sized to accommodate connector shuttle 110 (or any other suitable connector element, including connectors that may be used with a chain drive), the trolley body designed with a cutaway on the opposite side of the trolley centreline to bore 244 as shown in FIGS. 10, 11, so to preclude any interference with the belt (or, alternatively, the chain) on its return run.

Figure 7:
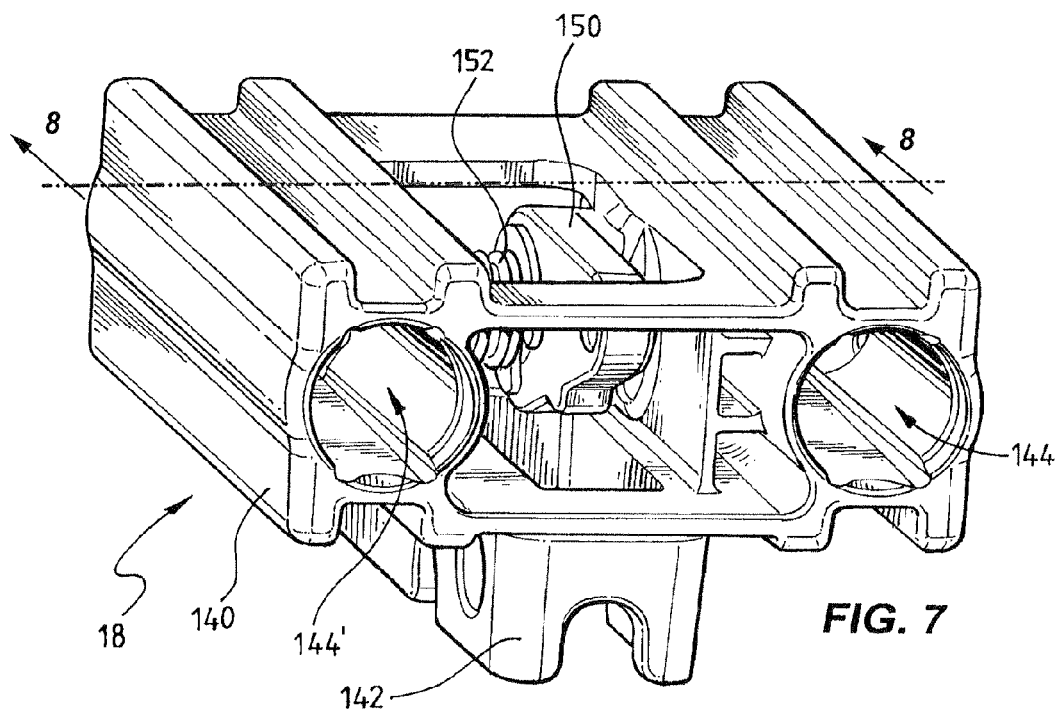
FIG. 7 is a perspective view of a drive trolley for use with the device of FIG. 2.
Figure 8:
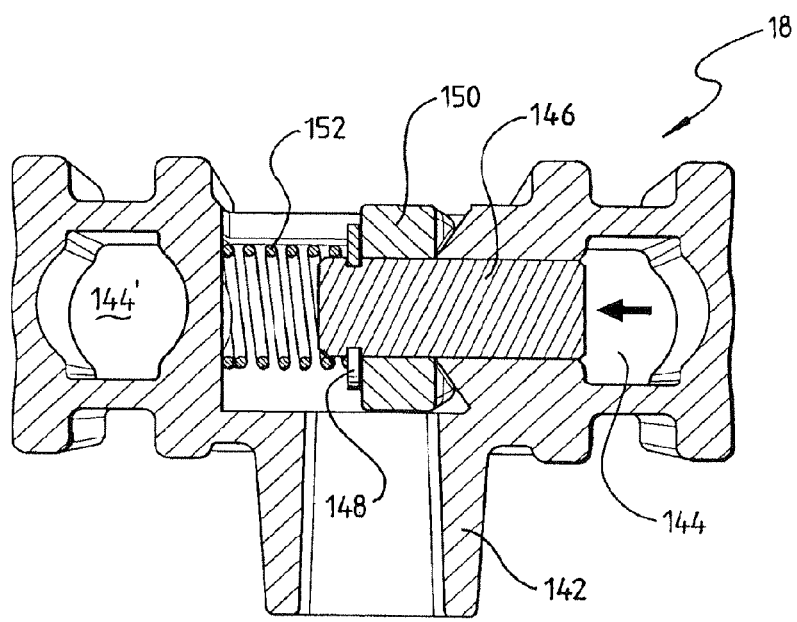
FIG. 8 is a cross sectional view of the drive trolley of FIG. 7.

As the drawings show, shaft 246 is mounted to move into longitudinal bore 244 under the action of compression spring 252 in a direction approximately 30° from the horizontal. In other respects, the mechanism of the engagement means between the trolley and the drive belt/chain is identical to that illustrated in FIG. 7 and described above. The orientation of the shaft 246 ensures that any interference with the belt/chain is avoided, and also means that when an operator pulls down on release handle 24 of a cord attached to the end of clutch lever 250, the resolved force tends to assist in urging shaft 246 against the compression spring force.

Figure 13:
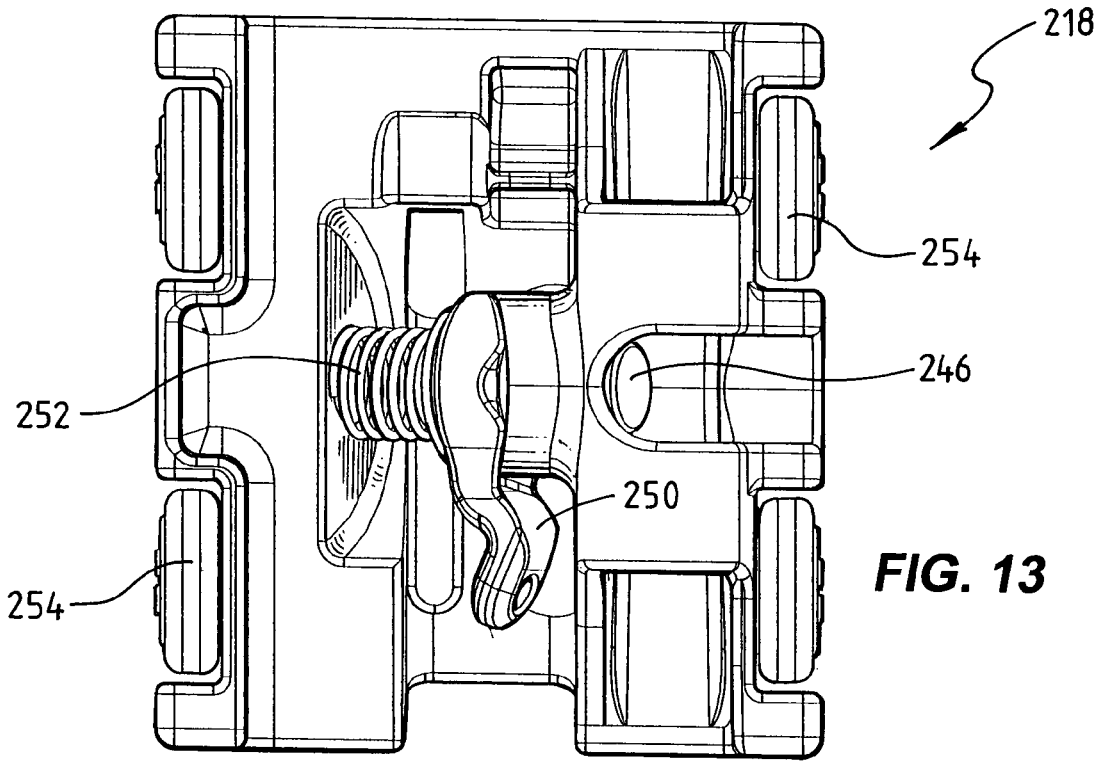
Figure 14:
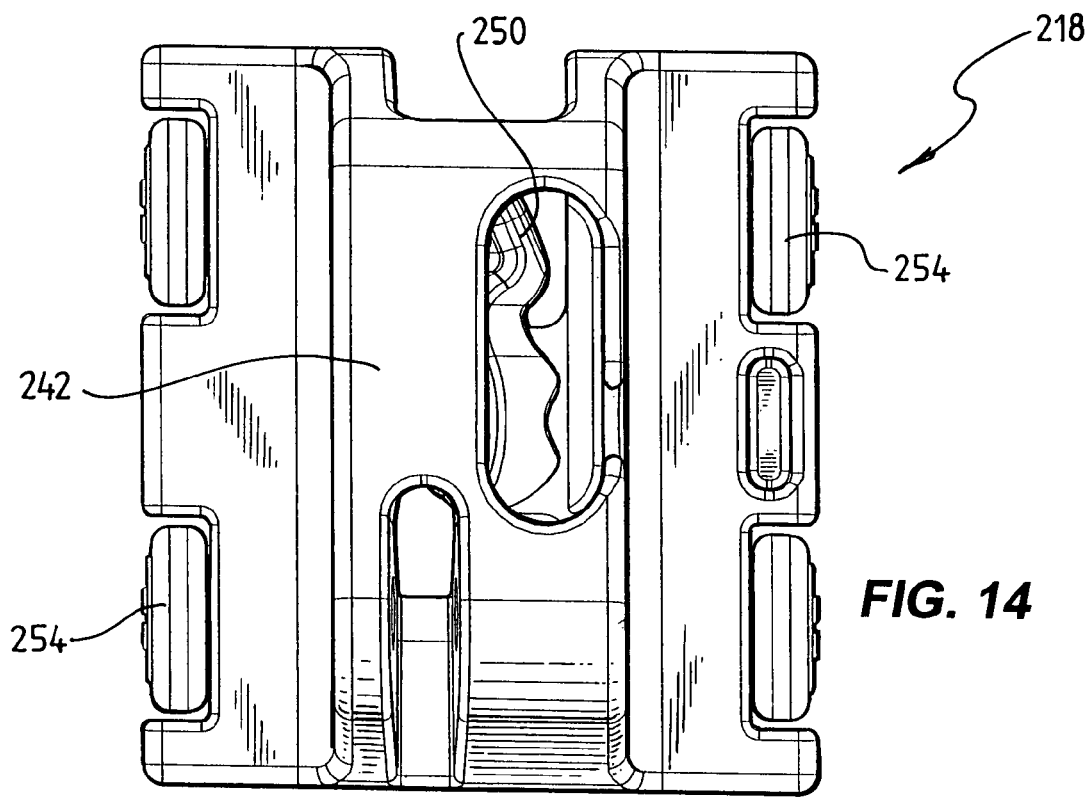

It is to be noted that the respective camming surfaces of clutch lever 150, 250 and of the complementary party of the trolley body provide a two-position biasing for the mechanism (see FIGS. 9, 13). In the 'engaged' position (shown), clutch lever 150, 250 is securely held in its primary biased position. When the operator pulls down on release handle 24 of a cord attached to the end of clutch lever 150, 250, the camming arrangement results in the tensioning of spring 152, 252 until the clutch lever engages in its secondary biased position, 90° from the primary biased position.

From this point, a small movement of the arm of clutch lever 150, 250 in the opposite direction, realised by the operator pulling the release handle with a horizontal component away from the door, causes the arm to ride up out of its secondary biased position and resiliently and firmly seat back into its preferred primary biased position, thus enabling re-engagement of the trolley with the drive.

In addition, trolley 218 is fitted with four wheels 254 mounted as shown for rotation on plastic moulded axles projecting from the sides of body 240. Trolley 218 is designed for use with a track 220 of generally C-section, with respective inwardly-directed flange portions 225 and respective lip returns 226, as shown in FIG. 11, defining an open part of track 220 arranged to be orientated in a downward direction when mounted. When installed, trolley 218 is held securely within the confines of the track, only the lower connection portion 242 projecting out of the track. As the skilled reader will appreciate, the trolley (and indeed the belt/chain) is thus largely enclosed within C-section track 220 and the arrangement provides limited access to the trolley. The movement of the engagement means 246 in a horizontal direction, or in a direction within about 45° from the horizontal, has the advantage that the actuation means 250 can be positioned approximately centrally of the trolley, and thus readily accessible to the operator by means of a depending pull cord or similar.

Track 220 is provided for installation in modular form, and therefore the mounted track comprises a plurality of sections, with an inevitable slight discontinuity or unevenness at the transitions between successive track sections. Wheels 254 allow the trolley to smoothly roll over these transitions, thus avoiding the scraping and wear of plastic body 240 that would otherwise result. Again, this has particular advantage when used with partially enclosed tracks such as track 220 shown in FIG. 11.

The various components of the assembly are manufactured from appropriate materials. Track 20, 220 in which trolley 18, 218 runs may be manufactured from pre-galvanized roll-formed 1.3 mm steel sheet, or alternatively from aluminium. The body of trolley 140,240 may be moulded from acetal (DuPont—Delrin 500), a self-lubricating plastics material, whilst trolley wheels 254 may be of nylon material.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

The invention claimed is:

1. A drive assembly for a moveable closure selected from a door, gate and barrier, comprising:
   a track;
   a trolley for connection to the moveable closure, the trolley mountable to run along the track;
   a longitudinal drive comprising a chain or belt, connectable in a closed loop arrangement around or within the track, said closed loop defining a plane;
   the trolley provided with an engagement mechanism for selective engagement between the trolley and the longitudinal drive;
   the engagement mechanism including an engagement member arranged for selective movement in a direction substantially transverse to the longitudinal direction of the longitudinal drive and in a direction less than 45° from the plane of the loop of the longitudinal drive;

the engagement member including or cooperating with a cam part a cam part which rotates about the engagement member, and a camming cooperation between the cam part and the trolley body which converts rotation of the cam part about the engagement member into the required movement of the engagement member.

2. The drive assembly of claim 1, wherein said engagement member is arranged against a resilient bias for cooperation with a recess or engagement portion provided in or attached to the longitudinal drive.

3. The drive assembly of claim 1, wherein a radial arm extends from said cam part, such that pulling on the radial arm rotates the cam part, so resulting in the required movement of the engagement member.

4. The drive assembly of claim 1, wherein the camming cooperation between said cam part and the trolley body provides a two-position bias, the positions separated by approximately 90° of rotation of the cam part.

5. The drive assembly of claim 1, wherein the engagement member is selected from a cylindrical pin and shaft, the required movement being in the axial direction of the engagement member.

6. The drive assembly of claim 1, wherein the trolley is provided with wheels adapted to run along the track.

7. The drive assembly of claim 1, wherein the longitudinal drive comprises a flexible toothed belt having a connector, the connector including a body having an internal recess with a shaping complementary to that of the toothed belt, configured to allow an end portion of the belt to be engaged therein in a direction transverse to the belt longitudinal direction, so to retain the belt against disengagement in the longitudinal direction.

8. The drive assembly of claim 7, wherein the recess is a slot formed in the connector body, the slot defined by first and second internal surfaces, at least one of which surfaces features spaced transverse grooves shaped and sized to accommodate a plurality of belt teeth.

9. The drive assembly of claim 7, including two belt-engagement portions, one at each end of the body, each having an internal recess in which to engage respective ends of a single length of belt stock.

10. The drive assembly of claim 7, wherein the connector body includes a drive engaging element, to afford connection between the belt and driven member and enable the required drive of the driven member.

11. The drive assembly of claim 7, comprising a cover element adapted to be secured in place on the connector body in order to at least partly close the internal recess once an end of a belt has been engaged therein.

12. The drive assembly of claim 11, wherein the cover element and the connector body are shaped to afford a snap-fit connection therebetween.

13. The drive assembly of claim 11, wherein the cover element is a part-cylindrical sleeve size and shaped to engage over the body of the connector in a transverse direction.

14. The drive assembly of claim 7, wherein the trolley includes a longitudinal bore configured to accommodate the connector, and the engagement mechanism provides engagement between the trolley and the connector when the connector is positioned within the longitudinal bore.

15. The drive assembly of claim 1, wherein the track is one which is partially enclosed and one within which the trolley may run, the longitudinal drive being arranged so as to be connectable in the closed loop arrangement within the partially enclosed track and engageable with the trolley, and wherein the trolley is provided with wheels adapted to run within and supported by the partially enclosed track.

16. The drive assembly of claim 15, in which the partially enclosed track has a substantially C-section form, the opening of the C-section to be oriented in use in a downward direction, the C-section form including inwardly-directed flange portions to provide runways for the trolley wheels.

17. The drive assembly of claim 1 wherein said track is a rail.

\* \* \* \* \*